United States Patent [19]

Campbell et al.

[11] 3,888,124

[45] June 10, 1975

[54] ATMOSPHERIC MERCURY SAMPLING MATERIAL AND METHOD

[75] Inventors: Evan E. Campbell; Bernard C. Eutsler, both of Los Alamos; Patricio E. Trujillo, Santa Fe, all of N. Mex.

[73] Assignee: The United States of America as represented by the United States Energy Research and Development Administration, Washington, D.C.

[22] Filed: Aug. 7, 1973

[21] Appl. No.: 386,465

[52] U.S. Cl. .............. 73/421.5 R; 55/72; 252/454; 356/36
[51] Int. Cl. ............................................. G01n 1/22
[58] Field of Search ................ 73/421.5 R, 421.5 A; 55/72; 356/36, 37; 252/454

[56] References Cited
UNITED STATES PATENTS

| | | | |
|---|---|---|---|
| 2,363,876 | 11/1944 | Lande, Jr. | 252/454 |
| 2,424,083 | 7/1947 | Finch | 252/454 |
| 3,193,987 | 7/1965 | Manes et al. | 55/72 |
| 3,257,776 | 6/1966 | Park et al. | 55/72 |
| 3,711,248 | 1/1973 | Coffey | 73/421.5 |

*Primary Examiner*—S. Clement Swisher
*Attorney, Agent, or Firm*—John A. Horan; Edward C. Walterscheid

[57] ABSTRACT

Adsorbing media for sampling metallic mercury vapor from an air stream which comprise silver metal coated on finely divided particulate siliceous substrates. Such substrates may range from sea sand to calcined diatomaceous earths. Particularly useful for this purpose is the calcined diatomaceous earth manufactured and sold under the tradename of Chromosorb P. The amount of mercury adsorbed on the silvered substrate is readily quantitatively determined by flameless atomic adsorption spectrophotometry. Heating the silvered substrate to 700°C volatilizes all adsorbed mercury and renders the substrate once again useful for mercury sampling.

4 Claims, No Drawings

ATMOSPHERIC MERCURY SAMPLING MATERIAL AND METHOD

BACKGROUND OF THE INVENTION

The invention described herein was made in the course of, or under, a contract with the U.S. ATOMIC ENERGY COMMISSION. It relates to materials useful for sampling atmospheric metallic mercury vapor and a method for determining the amount of mercury adsorbed on such materials.

Mercury is used for a wide variety of industrial and chemical purposes. Unfortunately, mercury has only recently been generally appreciated as a virulent poison that is readily absorbed through the respiratory tract, the gastrointestinal tract, or through unbroken skin. It acts as a cumulative poison since only small amounts can be eliminated at a time by the human body. The maximum allowable concentration of mercury vapor in air has been set at 0.1 mg/m$^3$ by National Institute of Occupational Safety and Health (NIOSH) for occupational exposure. Since mercury is very volatile, dangerous levels are readily attained in air. Air saturated with mercury vapor at 20°C contains a concentration which exceeds the toxic limit by more than 100 times, and the danger increases at higher temperatures.

On the basis of the foregoing facts it is readily apparent that a straightforward accurate method of sampling and measuring atmospheric metallic mercury vapor in the occupational environment is urgently desired. To be most useful any such method must be capable of accurately sampling low concentrations of mercury over long periods of times at relatively low flow rates. It is known in the art that iodized charcoals or charcoals prepared from coconut shells are capable of quantitatively adsorbing rather large quantities of mercury vapor. Accordingly, one technique that has been tentatively proposed for determining mercury vapor in air involves adsorbing the mercury vapor on particulate iodine-impregnated charcoal by flowing air through a tube containing two sections, each holding 150 mg of 20–40 mesh charcoal, for a predetermined length of time and then determining the amount of mercury adsorbed on the charcoal by flame atomic absorption spectroscopy. This technique in large measure on the method of Moffitt and Kupel. See "A Rapid Method Employing Impregnated Charcoal and Atomic Absorption Spectrometry for the Determination of Mercury," Amer. Indust. Hyg. J. 32, 614–620 (1971). Unfortunately, charcoal is by no means an optimum mercury adsorber for use in any technique of this type. It is not qualitative to mercury vapor alone but rather adsorbs many materials that interfere with the accurate determination of mercury. Further, various charcoals have differing abilities to absorb mercury. Thus, for example, "Mersorb" charcoal, which is an iodine-impregnated charcoal produced by Mine Safety Appliances Company is several times more effective for trapping and retaining mercury vapor than is a coconut charcoal (Fisher No. 5-685-B) or another iodine-impregnated charcoal (Barnebey-Cheney Type 580-13). Mersorb, however, has the disadvantage of producing a background atomic absorption signal equivalent to as much as 0.1 μg of mercury. In addition, flame atomic absorption spectroscopy of charcoals containing known quantities of mercury does not give consistently reproducible results. Finally, the uniformity of the charcoal cannot be characterized or reproduced.

It is known in the art that silver metal will selectively adsorb mercury. In principle, therefore, it should be capable of avoiding certain of the problems of a qualitative nature associated with the use of charcoals as mercury vapor adsorbers. Indeed, silver gauze or silver wool have been proposed as absorbing materials for the sampling of mercury vapor in air. Unfortunately, unless very large quantities of silver wool and very low flow rates, i.e., substantially less than 1 $l$/min, are used, at mercury vapor concentrations of about 0.1 μg/$l$ or higher, the mercury vapor is not quantitatively adsorbed. That is to say, almost immediately a certain amount of the mercury vapor flows through the silver wool without in fact being adsorbed.

SUMMARY OF THE INVENTION

In accordance with the method of the present invention low levels of metallic mercury vapor in the air of the environment may be quantitatively measured by passing a known volume of air through a silvered particulate siliceous substrate and analyzing the mercury adsorbed thereon by thermal desorption followed by flameless atomic absorption spectrophotometry. Preferred adsorbers have large effective surface areas. Various siliceous materials, in particular calcined diatomaceous earths, are known which have surface areas ranging from about 0.6 to about 13 m$^2$/g and are therefore useful as substrates within the scope of the invention. Calcined diatomaceous earths are readily silvered by application of the standard Brashear's Silvering Solution. The silvered particulate substrates of the invention have an added advantage in that on being heated to 700°C, all mercury is driven off without any adverse effect to the substrates themselves. They are thus readily reusable for new mercury sampling.

DESCRIPTION OF THE PREFERRED EMBODIMENTS

As used within this application, a siliceous material is one which is composed of about 50% or more of silica. A silvered substrate is one which has been coated or plated with a thin layer of silver.

Particulate substrates may readily be silvered according to the following technique. A silver nitrate solution is prepared by dissolving 20 g of AgNO$_3$ crystals in 30 ml of distilled water. Ammonium hydroxide solution (28%) is stirred into the AgNO$_3$ solution until a dark brown precipitate of Ag$_2$O forms and the solution begins to clear. A second AgNO$_3$ solution, prepared by dissolving 4 g of AgNO$_3$ crystals in 60 ml of distilled water, is then added dropwise until the solution is a distinct straw color. A KOH solution consisting of 14 g of KOH in 100 ml of distilled water is then added slowly with constant stirring. Ammonium hydroxide is added until the solution just clears. The second AgNO$_3$ solution is added until a thin straw or brown precipitate appears. The solution is then filtered through glass wool. A dextrose solution consisting of 7.8 g of dextrose in 120 ml of distilled water is then mixed in and the particulate material to be plated is immediately immersed therein and left until coated with silver. To ensure that all surfaces of the particulates are plated, it is desirable that they be continuously stirred during the plating process.

In one embodiment of the invention, commercial sea sand consisting essentially of silica washed with dilute nitric acid and distilled water and sieved to 20–40 mesh (U.S. Standard Sieve) was plated with silver according to this technique. In another embodiment, a commercially available type of calcined diatomite sold under the tradename Chromosorb P by Johns Manville was sized to 30–60 mesh and plated with silver according to this technique. Chromosorb P is prepared by calcining natural diatomite (Kieselguhr) at a temperature up to 1,600°C. Because natural diatomite does not have a constant composition, there is some variation in the chemical composition of Chromosorb P. Thus, Blandenet and Robin, J. Gas Chromat., p. 225 (July 1964) and Palframan and Walker, Analyst, vol. 92, p. 71 (1967) indicate the following compositions.

|  | Blandenet et al. | Palframan et al. |
|---|---|---|
| $H_2O$ | 0.28 | 0.3 |
| $SiO_2$ | 89.2 | 90.6 |
| $Al_2O_3$ | 5.1 | 4.4 |
| $Fe_2O_3$ | 1.50 | 1.6 |
| $TiO_2$ | 0.30 | 0.2 |
| CaO | 0.90 | 0.6 |
| MgO | 1.00 | 0.6 |
| $Na_2O$ | 0.70 | 1.0 |
| $K_2O$ | 0.55 |  |

Palframan, et al., report the surface area of 60 to 80 mesh Chromosorb P as 4.0 m²/g based on a Johns-Manville technical bulletin. Blandenet et al. report specific surface areas ranging from 2.80 to 5.24 m²/g, depending on the measuring technique.

The efficacy of a particular metallic mercury vapor adsorber is readily determined through use of a parameter called "breakthrough time." This is the period that a specified flow of a given mercury-vapor concentration can continue before detectable traces of mercury pass through a standard air sampling tube. Breakthrough times for various mercury vapor adsorbing materials are given in Tables I and II. All air sampling tubes were of glass with an inside diameter of 4 mm. The adsorbing material was in two 18-mm sections separated by glass wool and held in place by glass wool plugs at either end. The charcoal tubes contained approximately 150 mg of charcoal in each section. All charcoal was conditioned at 700°C for one hour before use. In Table I, the mercury concentrations were in flowing nitrogen. In Table II, there was a constant mercury concentration of 0.1 μg/l in flowing air. Because of the long breakthrough time observed with the silvered Chromosorb P (see Table II), a smaller (1 cm) section was evaluated in the same manner as the standard (1.8 cm) section. The breakthrough times for the 1 cm section at 1.0 and 0.5 l/min sampling rate at 0.1 μg Hg/l of air were 470 and 1,440 minutes, respectively.

The National Institute for Occupational Safety and Health (NIOSH) has established criteria stating that tubes used for sampling mercury vapor in air must have a total pressure drop of less than 2.5 in. of $H_2O$ at 200 cm³/min and a drop of less then 1 in. of Hg at 1 l/min flow rate. The pressure drop for various lengths of silvered Chromosorb P in standard 4 mm i.d. sampling tubes was determined by passing nitrogen gas through the tubes at a constant flow rate and measuring the pressure difference across the ends of the tubes with monometers. The 1 l/min flow rate was calibrated using a wet test flow meter and the flow rate of 200 cm³/min was calibrated using a bubble flow meter. These flow rates are maintained throughout the study. Results of the pressure drop determinations are shown in Table III.

TABLE I

| Material | Flow Rate (liter/min) | Average Hg Vapor Concentration (mg/m³) | Breakthrough Time (min) | Breakthrough Amount** (μg) |
|---|---|---|---|---|
| Barneby-Cheney Charcoal | 0.98 | 0.34 | 170 | 57 |
|  | 1.02 | 0.75 | 85 | 65 |
|  | 0.50 | 1.95 | 115 | 112 |
| Fisher Charcoal | 1.01 | 0.86 | 90 | 83 |
| Mersorb Charcoal | 1.0 | 1.20 | >200* | — |
| Silvered Chromosorb P | 0.97 | 0.38 | >871* | — |
|  | 1.0 | 0.20 | >1000* | — |
| Silvered Sea Sand | 0.95 | 1.22 | 30 | 34 |
|  | 1.0 | 0.24 | 120 | 29 |

*Experiment terminated before breakthrough
**Total amount of Hg on both 150-mg sections of adsorbing material

TABLE II

| Absorbing Material in Tube | Sampling Rate (liters/min) | Breakthrough Time (min) |
|---|---|---|
| Barnebey-Cheney Charcoal | 1.0 | 960 |
| Fisher Charcoal | 1.0 | 1506 |
| Silvered Sea Sand | 1.0 | 78 |
|  | 0.5 | 396 |
| Silvered Chromosorb P | 1.0 | 5670 |
|  | 0.5 | 14760 |

In sampling for mercury vapor concentration, a desired volume of air is flowed through a sampling tube containing a silvered particulate siliceous substrate, preferably a calcined diatomaceous earth such as Chromosorb P, and the amount of mercury adsorbed on the silvered substrate is then determined as follows. The sampling tube is placed in a thermal desorption unit connected to an atomic adsorption spectrophotometer operating on the 2,537 A line of mercury. Pure dry air is then flowed through the desorption unit and the spectrophotometer and the sampling tube heated sufficiently to completely desorb the mercury from the silvered substrate. Heating the tube to 700°C for 45 seconds will ensure that all mercury is desorbed. The desorbed mercury flows through the spectrophotometer and a reading is obtained. The absorption reading is corrected for an uncontaminated tube reading and the micrograms of mercury determined by reference to a predetermined calibration curve for the spectrophotometer. The concentration of mercury in air is then readily determined by the formula $$\mu g\ Hg/m^3 = \frac{\mu g\ Hg\ \text{from curve} \times 1000\ l/m^3}{\text{sampling rate (l/min)} \times \text{sampling time (min)}}$$

TABLE III

| Length (cm) | Inches of Hg (1 l/min) | $\bar{x}\pm s$ | Inches of H$_2$O 200 cm$^3$/min | $\bar{x}\pm s$ |
|---|---|---|---|---|
| 1 | 0.79 | | 2.1 | |
| 1 | 0.83 | | 2.0 | |
| 1 | 0.71 | 0.78±0.05 in. of Hg | 1.7 | 1.9±0.2 in. of H$_2$O |
| 1 | 0.83 | | 1.8 | |
| 1 | 0.75 | | 1.9 | |
| 2 | 1.22 | | 3.5 | |
| 2 | 1.18 | | 3.1 | 3.1±0.3 in. of H$_2$O |
| 2 | 1.38 | 1.29±0.09 in. of Hg | 2.8 | |
| 2 | 1.38 | | 2.9 | |
| 2 | 1.30 | | 3.1 | |
| 4 | 2.44 | | 5.5 | |
| 4 | 2.60 | | 5.4 | 6.3±0.8 in. of H$_2$O |
| 4 | 2.80 | 2.83±0.34 in. of Hg | 7.6 | |
| 4 | 3.31 | | 7.2 | |
| 4 | 2.99 | | 7.0 | |

To test sampling tubes containing silvered Chromosorb P in the field, a number of air samples were taken from two locations in an area suspected of being contaminated with low concentrations of metallic mercury vapor. This area was a small room used for the purification of mercury by redistillation. Location A was a point about 20 in. above the floor just in front of a hood used for the distillation process. Location B was 5 in. off the floor, also in front of the same hood. The room temperataure remained at about 70°C during the three sampling days.

The air sampling tubes consisted of 1-cm sections of 30–60 mesh silvered Chromosorb P inside glass tubes with a 4 mm i.d. Just prior to use, all the sampling tubes were preheated in a thermal desorption unit to about 700°C for 45 sec and purged with clean air during the heating to remove any mercury adsorbed by the tubes during fabrication. The tubes were then transferred directly from the desorption unit into small glass vials which were stoppered until used. The sampling tubes were removed from the vials at the sampling locations and attached to a Model No. 92814 MSA pump. After a predetermined volume of air passed through the sampling tubes, they were removed from the pump and placed back into the vials.

The vials were returned to the analytical laboratory and the tubes heated at 50°C for at least 4 hours to remove any collected moisture. After drying, the mercury in the sampling tubes was analyzed using the thermal desorption-atomic absorption technique described earlier. The expansion for the recorder was set at the 0 to 30% absorption range since preliminary analyses indicated that the mercury content of the tubes was above 10 ng. Results of the analyses are shown in Table IV. The results show acceptable variation considering that the samples were collected on different

TABLE IV

| No. | Location | Date | (l/min) | (l) | μg Hg/sample | mg Hg/m$^3$ |
|---|---|---|---|---|---|---|
| 1 | A | 3/6/73 | 1.0 | 5 | 0.011 | 0.0022 |

TABLE IV-Continued

| No. | Location | Date | (l/min) | (l) | μg Hg/sample | mg Hg/m$^3$ |
|---|---|---|---|---|---|---|
| 2 | blank | 3/6/73 | — | — | 0 | 0 |
| 3 | A | 3/8/73 | 0.2 | 2 | 0.004 | 0.002 |
| 4 | A | 3/8/73 | 0.2 | 1.5 | 0.003 | 0.002 |
| 5 | A | 3/8/73 | 0.2 | 1 | 0.002 | 0.002 |
| 6 | A | 3/8/73 | 0.2 | 0.5 | <0.002 | <0.004 |
| 7 | blank | 3/8/73 | — | — | 0 | 0 |
| 8 | A | 3/9/73 | 0.6 | 8 | 0.0167 | 0.0021 |
| 9 | A | 3/9/73 | 0.6 | 6 | 0.0180 | 0.0030 |
| 10 | A | 3/9/73 | 0.6 | 4 | 0.0093 | 0.0023 |
| 11 | A | 3/9/73 | 0.6 | 2 | 0.0057 | 0.0028 |
| 12 | blank | 3/9/73 | — | — | 0 | 0 |
| 13 | B | 3/6/73 | 1.0 | 5 | 0.041 | 0.0082 |
| 14 | B | 3/8/73 | 0.2 | 0.5 | 0.005 | 0.010 | dates and at different sampling rates and volumes. The detection limit of the analytical method using the 0 to 30% absorption range is about 0.001 μg for the spectrophotometer used (a modified MAS-50 Mercury Monitor). Thus, the results for samples 3, 4, 5, and 6 are very close to the detection limit; however, samples 8, 9, 10, and 11 confirm these results with larger air volumes.

On the basis of the foregoing data, it is apparent that silvered particulate siliceous substrates present advantageous features over prior art adsorbers used for sampling metallic mercury vapor from the air. It is further apparent that silvered calcined diatomaceous earths are particularly efficacious for this purpose, primarily because of the large effective surface areas they present for mercury adsorption. Chromosorb P, when silvered, is particularly suitable for this purpose, but it is by no means the only calcined diatomaceous earth within the scope of this invention. Thus, for example, the literature reveals a wide variety of siliceous materials and other calcined diatomaceous earths having surface areas ranging from about 0.6 to about 13 m$^2$/g. It will be readily apparent on the basis of the disclosure of this specification that when silvered, particulate siliceous substrates having effective surface areas in this range are within the scope of the invention.

We claim:

1. In a method for determining the content of metallic mercury vapor in air by passing a known volume of said air through a mercury vapor absorbing material and subsequently thermally desorbing the mercury adsorbed thereon and measuring its amount by atomic absorption spectroscopy, the improvement consisting of using as the adsorbing material a silvered particulate calcined diatomaceous earth substrate.

2. The method of claim 1 wherein said metallic mercury vapor adsorbing material has a particulate size in the range of 20 to 60 mesh.

3. The method of claim 1 wherein said metallic mercury vapor adsorbing material has a surface area in the range of about 0.6 m$^2$/g to about 13 m$^2$/g.

4. The method of claim 3 wherein said metallic mercury vapor adsorbing material has a surface of about 4 m$^2$/g.

* * * * *